Patented Jan. 21, 1930

1,744,351

UNITED STATES PATENT OFFICE

HUGO ACKERMANN, OF GOVESBERG, WILHELM LANGENHEIM AND HERMANN KNUTH, OF BONN, GERMANY

PROCESS FOR THE MANUFACTURE OF REFRACTORY ACID RESISTING AND OTHER PRODUCTS BONDED BY MEANS OF CLAY

No Drawing. Application filed June 17, 1926, Serial No. 116,722, and in Germany June 22, 1925.

This invention relates to the manufacture of refractory, acid resisting and other ceramic products, bonded by means of clay.

The usual method of manufacturing these products is to grind the grog or another non-plastic material more or less finely, and to mix it with more or less great quantities of binding clay. The comparatively greasy mass is intimately mixed with addition of water and formed into bricks or other objects which are subsequently dried and burnt.

According to the special requirements which the ceramic products have to meet different non-plastic materials may be used for example chamotte (that is grog) or natural or artifical corundum, quartzite, cyanite, sillimanite, chromite, carborundum, zirconium, magnesite, or magnesia, dolomite or any other material, suited to be bonded by clay.

It has been found that in the usual method of manufacturing the above mentioned products it is very difficult to mix the non-plastic more or less coarse grained materials perfectly uniformly with the binding clay.

As a result of the non-uniform distribution of the two components in the mixture differences in shrinking occur at various points of the brick resulting in a distortion of its external shape. Further the chemical and physical structure of the brick is not uniform, so that the resistance of the brick to high temperature, sudden changes in temperature, chemical treatment and mechanical stresses at high temperatures is impaired.

Even when a somewhat uniform mixture is effected by a very tedious and costly prolonging of the mixing process a considerable shrinkage both in drying and in burning occurs if large amounts of binding clay and water are added to the mixture. Usually the non-plastic components of the mixture are calcined or burnt before grinding them, so that in firing the brick they are burnt twice and therefore obtain a higher grade of transformation and consequently other physical properties than the binding clay, which is burnt only once. The greater the portion of binding clay in the brick, the greater is the unfavorable effect of the above mentioned differences between the two components of the mixture. In using lower percentages of binding clay it has been proposed to admix clay and water to the ground non-plastic material in the form of a thin sludge, or this clay-sludge may be ground together with a small part of the non-plastic material to form a slurry which is then mixed with the rest of the ground non-plastic substance.

If an excess of water is used in preparing such masses it has further been proposed to work the mass in heated condition, if desired in a vacuum, until the water content is reduced sufficiently to give the mass the proper consistence for moulding.

The object of the present invention is to obtain in a simple and secure way a good binding of the non-plastic materials in the manufacture of products bonded by means of clay and at the same time to use the smallest possible amount of clay. According to the invention this will be reached by mixing the binding clay in the form of a casting slip with the non-plastic materials in such a proportion, that a non castable mass is obtained which is moulded by beating, stamping, pressing or in any similar way likely to secure close contact between the adjoining grains of the mass It is known that a mixture of water and clay may be transformed into a casting slip by adding a small amount of alkalies, soda or other liquefying ingredients. Also it is known, to cast objects of a casting slip, consisting of liquefied clay and non-plastic materials. This slip-casting process may be modified by subjecting to pneumatic pressure the newly cast article after it has begun to acquire coherence but while it is still in kneadable condition and supported by the porous mould. But nobody has hitherto .n-ployed the liquefied clay in binding so large quantities of non-plastic materials, that the mass cannot be cast, but must be moulded by beating, stamping or pressing.

By its conversion into a casting slip the binding clay is transformed into a very disintegrated mass and is converted into a dispersed state, thereby considerably increasing its binding capacity. In using this casting slip of colloidal disintegration for the manufacture of products bonded by means of clay only a very small amount of binding clay is required and at the same time a thoroughly uniform distribution of the binding clay in the mixture is easily obtained.

The inventors have found that in using the binding clay in liquefied state a very small amount of clay, which according to the quality of the binding clay and the pressure employed in moulding the brick may be diminished to 2-5% of the weight of the mass, is sufficient to maufacture clay bonded products whose qualities surpass in many regards those of the products made by methods hitherto used.

The total shrinkage of the new product is considerably reduced by the small amount of binding clay used and the uniformity of structure of the brick is considerably improved by the good distribution of the casting clay slip in the mixture.

The refractoriness of those products made from high refractory non-plastic materials such as corundum is importantly improved in consequence of the small content of binding clay. The small portions of alkali which are required to convert the binding clay into a casting slip cannot impair the favorable results effected by the small content of clay as they amount to only about 1–1½% of the quantity of the binding clay and thus form only a small portion of one per cent of the total mass.

By manufacturing refractories from quartzite according to the new process, silica bricks bonded by clay are obtained, which are absolutely equivalent to silica bricks bonded by lime as regards strength of binding, resistance to crushing, refractoriness and high content of solicic anhydride and surpass the same as regards resistance to sudden temperature changes in consequence of their superior homogeneousness.

If advisable the liquefied binding clay may be transformed into a more thinly liquid state by adding a larger quantity of water than is required for producing the casting state of a clay slip. The water added in excess can be removed if and as far as necessary, before moulding the mixture by means of the usual agents, for instance by heat. According to this process much smaller portions of binding clay may be employed than was previously considered possible, without impairing the uniformity of the mixture or the good binding between the adjoining grains of the same.

For shaping or moulding masses, prepared in the manner described by mixing ground non-plastic materials with a small amount of clay-slip, any method may be used, by which a very close contact between the adjoining grains of the mass is obtained. The mass may for instance be stamped or beaten into the moulds or pressed in a high pressure press of any kind. The higher the pressure which with the mass is moulded, the better is the binding effect of the thin layer of clay-slip surrounding each grain. After drying the moulded articles may be burnt at a suitable temperature to cause a thorough fritting of the binding clay.

Fire bricks, manufactured in this way, have practically a completely homogeneous structure in chemical and physical regards. They show minimum porosity and shrinkage in drying or burning. Nevertheless they have an extraordinarily good strength of binding and their resistance to crushing is greater both at low and high temperatures than that of refractory products manufactured according to the usual processes. Their resistance to changes in temperature is considerably increased as a result of the decrease of their internal stresses.

Employing cheap non-plastic materials, for instance ground firebrick- or saggar-fragments, the use of small quantities of clay slip for binding purposes according to the invention results in lowering the cost of the mixture according to the diminishing the portion of costs, which relates to the binding clay.

A particular method of carrying out the new process consists in not liquefying binding clay by itself and then mixing it with the total amount of non-plastic ground materials, but working it up into a casting slip together with a portion of the non-plastic materials and then mixing the slip with the rest of the latter.

In this case the procedure may either be to liquefy a mixture of clay and grog, or quartzite, or another non-plastic ground material or firstly to liquefy the clay and then add to the clay slip such a portion of the ground non-plastic material, so that the mixture may still be casted.

The addition of a portion of the non-plastic ground material during the preparation of the casting slip has the advantage that the added particles of the grog, quartzite, corundum and the like, on treating the slip in a stirring device, carry out a triturating action on the binding clay and so accelerate and make easier the solution thereof by which means a large part of the stirring treatment and consequently time and energy is saved.

The portion of the non-plastic grains, which is suspended in the clay slip is already enclosed during the preparation of the casting slip very completely with the finest particles of the clay, hereby saving a part of the further mixing treatment. Preferably the finest grains of the non-plastic material should be used in being added to the clay slip in the manner described.

We declare that what we claim is:

1. The process of making ceramic products bonded by means of clay, consisting in liquefying the binding clay in any known way by admixing a sufficient quantity of water and a suitable quantity of liquefying ingredients, for instance alkali, admixing the clay-slip thus obtained to the ground grog, or corundum, or quartzite, or zirconium, or any other non-plastic material fit to be bonded by means of clay, in such a proportion that a non-castable mass is obtained which is moulded by beating, stamping, pressing or in any similar way likely to secure close contact between the adjoining grains of the mass, after which the moulded products are dried and burnt.

2. The process of making ceramic products bonded by means of clay consisting in transforming the binding clay by admixing a suitable quantity of liquefying ingredients for instance alkali and an excess of water into a diluted clay slip, the excess of water being such as to secure a thoroughly uniform distribution of small amounts of binding clay, in the mass during the subsequent mixing, admixing such a quantity of the diluted clay-slip to the ground non-plastic material as to obtain a mixture containing 10% or less of clay, removing from the mixture the excess of water as far as necessary for further treatment, moulding this mass by beating, stamping or pressing or in any similar way likely to secure close contact between the adjoining grains of the mass, after which the moulded products are dried and burnt.

3. The process of making ceramic products bonded by means of clay consisting in mixing the binding clay before, during or after its transformation into the liquefied state by admixing water and a suitable quantity of liquefying ingredients for instance alkali with such a part of the ground non-plastic material as to obtain a fluid slip, then mixing this slip with the rest of the ground non-plastic material in such a proportion that a non-castable mass is obtained which is moulded by beating, stamping, pressing or in any similar way likely to secure a close contact between the adjoining grains of the mass, after which the moulded products are dried and burnt.

4. A refractory ceramic product consisting of ground non-plastic ceramic material having the grains coated with a very thin film of vitrified alkaline clay-slip.

In testimony whereof we affix our signatures.

Dr. Ing. HUGO ACKERMANN.
WILHELM LANGENHEIM.
Dr. Phil. HERMANN KNUTH.